(12) United States Patent
Kajimura et al.

(10) Patent No.: US 10,995,956 B2
(45) Date of Patent: May 4, 2021

(54) COMBUSTOR AND METHOD FOR IMPROVING COMBUSTOR PERFORMANCE

(71) Applicant: Mitsubishi Hitachi Power Systems, Ltd., Kanagawa (JP)

(72) Inventors: Shuhei Kajimura, Tokyo (JP); Kenji Miyamoto, Tokyo (JP); Taiki Kinoshita, Yokohama (JP); Kotaro Miyauchi, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 157 days.

(21) Appl. No.: 16/087,296

(22) PCT Filed: Mar. 28, 2017

(86) PCT No.: PCT/JP2017/012521
§ 371 (c)(1),
(2) Date: Sep. 21, 2018

(87) PCT Pub. No.: WO2017/170476
PCT Pub. Date: Oct. 5, 2017

(65) Prior Publication Data
US 2019/0113231 A1    Apr. 18, 2019

(30) Foreign Application Priority Data
Mar. 29, 2016    (JP) .............................. JP2016-065018

(51) Int. Cl.
*F23R 3/00*    (2006.01)
*F23R 3/06*    (2006.01)
(Continued)

(52) U.S. Cl.
CPC .................. *F23R 3/06* (2013.01); *F02C 7/18* (2013.01); *F02C 7/24* (2013.01); *F23R 3/14* (2013.01);
(Continued)

(58) Field of Classification Search
CPC .. F23R 3/002; F23R 3/16; F23R 2900/00017; F23R 2900/03042; F23R 2900/00014; F01D 9/023; F05D 2260/202
See application file for complete search history.

(56) References Cited

U.S. PATENT DOCUMENTS 2,684,574 A * 7/1954 Marskell ................... F23R 3/26
                                                           60/757
3,675,419 A * 7/1972 Lewis ....................... F23R 3/16
                                                           60/804
(Continued)

FOREIGN PATENT DOCUMENTS

CN    102913950    2/2013
CN    103764974    4/2014
(Continued)

OTHER PUBLICATIONS

International Search Report dated Jun. 20, 2017 in corresponding International (PCT) Application No. PCT/JP2017/012521, with English-language translation.
(Continued)

*Primary Examiner* — Gerald L Sung
*Assistant Examiner* — Rene D Ford
(74) *Attorney, Agent, or Firm* — Wenderoth, Lind & Ponack, L.L.P.

(57) ABSTRACT

A combustor (3) includes: a fuel nozzle configured to inject fuel; a tubular body (24) having a tubular shape in which a combustion region through which combustion gas flows is formed inside, and in which a plurality of slits (50) are formed extending in the circumferential direction at intervals in the circumferential direction; and throttle pieces (60) which are fitted into the slits (50), project radially inward from the inner circumferential side of the tubular body (24), and have a throttle face that extends along the flow direction
(Continued)

of the combustion gas as it extends from the radially outer side inward.

3 Claims, 17 Drawing Sheets

(51) Int. Cl.
    *F02C 7/18*     (2006.01)
    *F02C 7/24*     (2006.01)
    *F23R 3/16*     (2006.01)
    *F23R 3/42*     (2006.01)
    *F23R 3/14*     (2006.01)
    *F23R 3/28*     (2006.01)
    *F23R 3/50*     (2006.01)

(52) U.S. Cl.
    CPC ............... *F23R 3/16* (2013.01); *F23R 3/28* (2013.01); *F23R 3/42* (2013.01); *F23R 3/50* (2013.01); *F05D 2240/35* (2013.01); *F23R 3/002* (2013.01); *F23R 2900/00014* (2013.01); *F23R 2900/00016* (2013.01); *F23R 2900/00017* (2013.01)

(56) References Cited

U.S. PATENT DOCUMENTS

| | | | | |
|---|---|---|---|---|
| 4,168,348 | A * | 9/1979 | Bhangu | F23M 5/085 416/90 R |
| 5,497,611 | A * | 3/1996 | Benz | F23R 3/02 60/776 |
| 6,018,950 | A * | 2/2000 | Moeller | F01D 9/023 29/889.2 |
| 6,351,949 | B1 | 3/2002 | Rice et al. | |
| 8,667,801 | B2 * | 3/2014 | Roldan-Posada | F01D 9/023 60/39.37 |
| 8,950,190 | B2 | 2/2015 | Saito et al. | |
| 2005/0097890 | A1 | 5/2005 | Ikeda et al. | |
| 2005/0132708 | A1 * | 6/2005 | Martling | F23R 3/60 60/752 |
| 2007/0258808 | A1 * | 11/2007 | Ohri | F01D 9/023 415/139 |
| 2009/0053054 | A1 | 2/2009 | Grooms et al. | |
| 2010/0186415 | A1 * | 7/2010 | Brown | F23R 3/04 60/755 |
| 2012/0034075 | A1 * | 2/2012 | Hsu | F23R 3/005 415/178 |
| 2012/0125006 | A1 | 5/2012 | Saito et al. | |
| 2012/0198854 | A1 * | 8/2012 | Schilp | F23R 3/002 60/755 |
| 2012/0247111 | A1 * | 10/2012 | Narcus | F23R 3/005 60/752 |
| 2013/0074502 | A1 * | 3/2013 | Hada | F23R 3/002 60/726 |
| 2013/0180691 | A1 * | 7/2013 | Jost | F02K 1/822 165/135 |
| 2016/0047312 | A1 * | 2/2016 | Hase | F02C 7/18 60/806 |
| 2017/0089300 | A1 | 3/2017 | Tanaka et al. | |
| 2017/0138201 | A1 * | 5/2017 | Takata | F02C 7/18 |
| 2017/0254267 | A1 * | 9/2017 | Mizukami | F01D 9/023 |
| 2017/0292389 | A1 * | 10/2017 | Lorstad | F01D 25/12 |
| 2017/0299182 | A1 * | 10/2017 | Miyauchi | F23R 3/46 |
| 2018/0320595 | A1 * | 11/2018 | Sato | F23R 3/06 |

FOREIGN PATENT DOCUMENTS

| | | |
|---|---|---|
| EP | 2 762 708 | 8/2014 |
| JP | 4-268113 | 9/1992 |
| JP | 05-149543 | 6/1993 |
| JP | 2005-315457 | 11/2005 |
| JP | 2005-315473 | 11/2005 |
| JP | 2009-47413 | 3/2009 |
| JP | 2010-185438 | 8/2010 |
| JP | 2011-102669 | 5/2011 |
| JP | 2013-72316 | 4/2013 |
| JP | 2016-65678 | 4/2016 |
| WO | 2015/166921 | 11/2015 |

OTHER PUBLICATIONS

Written Opinion of the International Searching Authority dated Jun. 20, 2017 in corresponding International (PCT) Application No. PCT/JP2017/012521, with English-language translation.

* cited by examiner

COMBUSTOR AND METHOD FOR IMPROVING COMBUSTOR PERFORMANCE

TECHNICAL FIELD

The present invention relates to a combustor and a method for improving combustor performance.

This application claims priority based on Japanese Patent Application No. 2016-065018 filed in Japan on Mar. 29, 2016, contents of which are incorporated herein by reference.

BACKGROUND ART

A combustor used for a gas turbine or the like includes a fuel nozzle for injecting fuel and a tubular body through which combustion gas generated by combustion of the fuel flows. In the case of a gas turbine, this combustion gas is used to drive the turbine connected to the rear stage of the combustor.

Here, to suppress formation (to promote a complete combustion) of unburned carbide such as CO, it is preferable that a circulating flow of the combustion gas be formed inside the tubular body. To form a circulating flow, an example in which an outlet throttle described in Patent Document 1 below is provided on the inner circumferential side of the tubular body is known, for example. The combustion gas that flowed through the inside of the tubular body from the upstream side toward the downstream side collides with the outlet throttle to change the flow direction and head toward the upstream side again. A circulating flow of the combustion gas is thereby formed inside the tubular body.

The combustor disclosed in the above-described Patent Document 1 includes a tubular body positioned on the upstream side and a transition piece connected to the tubular body at the downstream side thereof. The outlet throttle described-above is provided at the downstream end of the tubular body. Therefore, the inner circumferential side of the tubular body can also be easily accessed by separating the tubular body and the transition piece. Namely, it is possible to easily provide an outlet throttle even for a combustor which has already been assembled.

CITATION LIST

Patent Document

Patent Document 1: JP 2005-315457 A

SUMMARY OF INVENTION

Problem to be Solved by the Invention

There is also a request to apply the outlet throttle described above afterwards to a combustor currently used. However, in a combustor in which the tubular body and the transition piece are formed integrally in the tubular body unlike the above-described configuration, it is difficult to install an outlet throttle afterwards, because a separation of the tubular body and the transition piece as described above is not assumed. In addition, even for a gas turbine (combustor) newly-built, it is difficult to install an outlet throttle at a midway position away from the opening end of the tubular body, due to restrictions of limited work space or the like. This may pose an obstacle to performance improvement of a combustor.

An object of the present invention is to solve the above-described problem by providing a combustor with improved performance and a method for improving performance of the combustor in which the performance can be easily improved.

Solution to Problem

According to a first aspect of the present invention, a combustor includes a fuel nozzle configured to inject fuel, a tubular body having a tubular shape and including a combustion region and a plurality of slits, the combustion region being formed inside the tubular body and configured to allow combustion gas generated by combustion of the fuel to flow, and the plurality of slits being formed extending in a circumferential direction at intervals in the circumferential direction; and throttle pieces fitted into the plurality of slits, protruding radially inward from an inner circumferential side of the tubular body and including a throttle face extending in a flow direction of the combustion gas as the throttle face extends from a radial direction outside toward a radial direction inside.

This configuration enables the throttle face of the throttle piece to promote the formation of the circulating flow of the combustion gas in the tubular body. Furthermore, the above configuration can be obtained simply by fitting the throttle piece from the radially outer side of the slit formed in the tubular body. This thereby enables the efficiency of the combustor to be easily improved.

According to a second aspect of the present invention, the combustor according to the first aspect further includes an acoustic damper disposed on an outer circumferential side of the tubular body and including a damping space formed inside the acoustic damper in communication with an interior of the tubular body. The throttle piece may be provided downstream from the acoustic damper.

Here, it is known that since the air leaks from the damping space of the acoustic damper, the temperature of the combustion gas is lowered in the region near the acoustic damper. Namely, unburned carbide such as CO is prone to be formed in this region.

However, according to the above configuration, since the throttle piece is provided downstream from the acoustic damper, a vortex is formed by the throttle face of the throttle piece. This vortex promotes mixing of the air and the combustion gas in the region on the downstream side of the acoustic damper, thereby enabling the formation of unburned carbide to be suppressed.

According to a third aspect of the present invention, a combustor includes a fuel nozzle configured to inject fuel, a tubular body having a tubular shape and including a combustion region and a plurality of cooling flow paths, the combustion region being formed inside the tubular body and configured to allow combustion gas generated by combustion of the fuel to flow, and the plurality of cooling flow paths being formed inside a wall surface while extending in a flow direction of the combustion gas and configured to allow cooling air to flow through the plurality of cooling flow paths, and a throttle ring having an annular shape, protruding radially inward from an inner circumferential side of the tubular body, including a throttle surface extending in the flow direction as the throttle surface extends from a radial direction outside toward a radial direction inside, and extending in a circumferential direction on the inner circumferential side of the tubular body. The combustor includes a cavity formed in an outer circumferential surface of the tubular body at a position further downstream from the throttle ring, the cavity being recessed and dented from the outer circumferential surface inward in a radial direction and extending in the circumferential direction across the plurality of cooling flow paths, and the combustor further includes a lid covering the cavity from the radial direction outside.

This configuration enables the throttle face of the throttle ring to promote the formation of the circulating flow of the combustion gas in the tubular body. Furthermore, in achieving such a configuration as described above, it is conceivable to divide the tubular body in the flow direction of the combustion gas, attach a throttle ring to one of the tubular bodies, and join the tubular bodies together. Here, in a case where the cavity described above is not formed, circumferential positions of the plurality of corresponding cooling flow paths formed inside the wall surface of each tubular body need to be aligned accurately, with a possibility of lowering the workability. However, according to the above configuration, since the cavity extending in the circumferential direction so as to extend across the plurality of cooling flow paths is formed, the tubular bodies may be joined together without considering circumferential positions of the cooling flow paths. This thereby enables a combustor with improved performance to be obtained more easily.

According to a fourth aspect of the present invention, a combustor includes a fuel nozzle configured to inject fuel, a tubular body having a tubular shape and including a combustion region and a plurality of cooling flow paths, the combustion region being formed inside the tubular body and configured to allow combustion gas generated by combustion of the fuel to flow, and the plurality of cooling flow paths being formed inside a wall surface while extending in a flow direction of the combustion gas and configured to allow cooling air to flow through the plurality of cooling flow paths, and a throttle ring having an annular shape, protruding radially inward from an inner circumferential side of the tubular body, including a throttle surface extending in the flow direction as the throttle surface extends from a radial direction outside toward a radial direction inside, and extending in a circumferential direction on the inner circumferential side of the tubular body. The combustor includes a pair of cavities formed in an outer circumferential surface of the tubular body, recessed and dented from the outer circumferential surface inward in a radial direction and extending in the circumferential direction across the plurality of cooling flow paths, in either side of the flow direction with respect to a position at which the throttle ring is provided, and the combustor further includes lids covering the respective cavities from the radial direction outside.

This configuration enables the throttle face of the throttle ring to promote the formation of the circulating flow of the combustion gas in the tubular body. Furthermore, in achieving such a configuration as described above, it is conceivable to divide the tubular body in the flow direction of the combustion gas, attach a throttle ring, and join the tubular bodies together. Here, in a case where the cavity described above is not formed, circumferential positions of the plurality of corresponding cooling flow paths formed inside the wall surface of each tubular body need to be aligned accurately, with a possibility of lowering the workability. However, according to the above configuration, since the cavity extending in the circumferential direction so as to extend across the plurality of cooling flow paths is formed, the tubular bodies may be joined together without considering circumferential positions of the cooling flow paths. This thereby enables a combustor with improved performance to be obtained more easily.

According to a fifth aspect of the present invention, the combustor according to the third or fourth aspect includes an acoustic damper disposed on the outer circumferential side of the tubular body and including a damping space formed inside the acoustic damper in communication with an interior of the tubular body. The throttle ring may be provided downstream from the acoustic damper.

Here, it is known that since the air leaks from the damping space of the acoustic damper, the temperature of the combustion gas is lowered in the region near the acoustic damper. Namely, unburned carbide such as CO is prone to be formed in this region.

However, according to the above configuration, since the throttle ring is provided downstream from the acoustic damper, a vortex is formed by the throttle face of the throttle ring. This vortex promotes mixing of the air and the combustion gas in the region on the downstream side of the acoustic damper, thereby enabling the formation of unburned carbide to be suppressed.

According to a sixth aspect of the present invention, a method for improving performance of a combustor is the method for improving performance of a combustor including a tubular body including a plurality of cooling flow paths formed inside a wall surface, extending in a flow direction of the combustion gas, and configured to allow cooling air to flow through the plurality of cooling flow paths, and a throttle ring having an annular shape, protruding radially inward from an inner circumferential side of the tubular body, including a throttle face extending in the flow direction as the throttle face extends from a radial direction outside toward a radial direction inside, and extending in a circumferential direction on the inner circumferential side of the tubular body, the method including the steps of forming a cavity in an outer circumferential surface of the tubular body, the cavity being recessed and dented from the outer circumferential surface inward in a radial direction and extending in the circumferential direction across the plurality of cooling flow paths, forming a pair of tubular body half bodies by dividing the tubular body along the cavity in two in the flow direction, attaching the throttle ring to the inner circumferential side of either one of the pair of tubular body half bodies, joining one of the pair of tubular body half bodies to which the throttle ring is attached to the other one of the pair of tubular body half bodies, and attaching a lid configured to cover the cavity.

According to this method, a throttle ring is attached to the inner circumferential side of one of the tubular body half body after the integral tubular body is divided into two tubular body half bodies. This enables work to be easily performed, for example, even when a throttle ring is applied to a combustor that has already been assembled or when a throttle ring is applied to a region where it is difficult to access from the opening end of the tubular body.

In addition, in a case where the cavity described above is not formed, circumferential positions of the plurality of corresponding cooling flow paths formed inside the wall surface of each tubular body need to be aligned accurately, with a possibility of lowering the workability. However, according to the above configuration, since the cavity is formed extending in the circumferential direction so as to extend across the plurality of cooling flow paths, the tubular bodies may be joined together without considering circumferential positions of the cooling flow paths. This thereby enables a combustor with improved performance to be obtained more easily.

According to a seventh aspect of the present invention, a method for improving performance of a combustor is the method for improving performance of a combustor including a tubular body including a plurality of cooling flow paths formed inside a wall surface, extending in a flow direction of the combustion gas, and configured to allow cooling air to flow through the plurality of cooling flow paths, and a throttle ring having an annular shape, protruding radially inward from an inner circumferential side of the tubular body, including a throttle face extending in the flow direction as the throttle face extends from a radial direction outside toward a radial direction inside, and extending in a circumferential direction on the inner circumferential side of the tubular body, the method including the steps of forming a pair of cavities in an outer circumferential surface of the tubular body, the pair of cavities being spaced apart in the flow direction, being recessed and dented from the outer circumferential surface inward in a radial direction, and extending in the circumferential direction across the plurality of cooling flow paths, forming, by dividing the tubular body along the pair of cavities into three in the flow direction, an upstream side divided body, an intermediate divided body, and a downstream side divided body, attaching the throttle ring to the inner circumferential side of the intermediate divided body, joining each of the upstream side divided body and downstream side divided body to the intermediate divided body to which the throttle ring is attached, and attaching lids configured to cover the pair of cavities.

In this method, the throttle ring is attached to the inner circumferential side of the intermediate divided body after the integral tubular body is divided into the upstream side divided body, the intermediate divided body, and the downstream side divided body. This enables work to be easily performed, for example, even when a throttle ring is applied to a combustor that has already been assembled or when a throttle ring is applied to a region where it is difficult to access from the opening end of the tubular body.

In addition, in a case where the cavity described above is not formed, circumferential positions of the plurality of corresponding cooling flow paths formed inside the wall surface of each tubular body need to be aligned accurately, with a possibility of lowering the workability. However, according to the above configuration, since the cavities are formed extending in the circumferential direction so as to extend across the plurality of cooling flow paths, the upstream side divided body, the intermediate divided body, and the downstream side divided body may be joined together without considering circumferential positions of the cooling flow paths. This thereby enables a combustor with improved performance to be obtained more easily.

In addition, since the intermediate divided body can be independently moved from the upstream side divided body and the downstream side divided body, a higher workability may also be secured than in a case in which each of the above steps is performed in a limited space around the combustor.

Advantageous Effect of Invention

The present invention enables provision of a combustor with improved performance and a method for improving combustor performance in which performance can be easily improved.

DESCRIPTION OF EMBODIMENTS

First Embodiment

Figure 1:
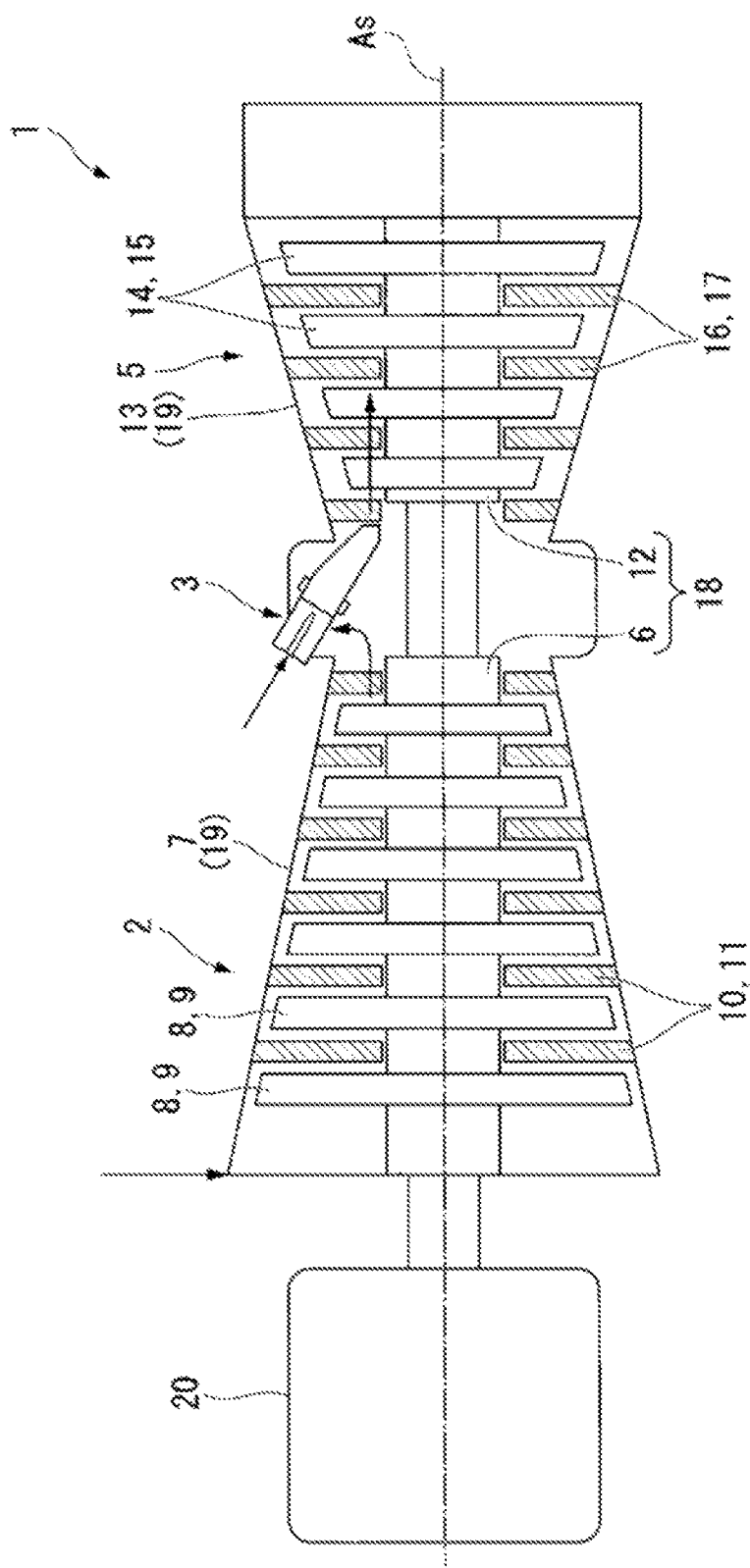
FIG. 1 is a schematic view illustrating the configuration of a gas turbine according to a first embodiment of the present invention.

A first embodiment of the present invention will be described with reference to FIG. 1 to FIG. 4. As illustrated in FIG. 1, a gas turbine 1 according to the present embodiment includes a compressor 2, a combustor 3, and a turbine 5.

The compressor 2 includes a compressor rotor 6 extending along an axis line As and a compressor casing 7 covering the compressor rotor 6 from the outer circumferential side. The compressor rotor 6 is in the form of a column having the axis line As as the center, and compressor blades 8 are mounted on the outer circumferential surface of the compressor rotor 6. A plurality of the compressor blades 8 are arranged at intervals in the circumferential direction with respect to the axis line As to form one compressor blade stage 9. A plurality of such compressor blade stages 9 are provided at intervals in the direction of the axis line As on the compressor rotor 6.

A plurality of rows of compressor vane stages 11 are arranged on the inner circumferential side of the compressor casing 7 so as to be staggered with respect to the compressor blades 8 in the direction of the axis line As. Similarly to the compressor blade stage 9, the compressor vane stage 11 has a plurality of compressor vanes 10 arranged at intervals in the circumferential direction with respect to the axis line As.

The combustor 3 mixes the fuel with the high-pressure air generated by the compressor 2 and burns it to generate high-temperature and high-pressure combustion gas. This combustion gas is sent to a turbine 5, which will be described later, to drive the turbine 5.

The turbine 5 includes a turbine rotor 12 extending along an axis line As and a turbine casing 13 covering the turbine rotor 12 from the outer circumferential side. The turbine rotor 12 is in the form of a column having the axis line As as the center, and a turbine blade 14 is attached to the outer peripheral surface thereof. A plurality of turbine blades 14 are arranged at intervals in the circumferential direction with respect to the axis line As to form one turbine blade stage 15. The plurality of such turbine blade stages 15 are provided on the turbine rotor 12 at intervals in the direction of the axis line As.

A plurality of rows of turbine vane stages 17 are provided on the inner circumferential side of the turbine casing 13, arranged in the direction of the axis line As, so as to be staggered with respect to the above-described turbine blade 14. The turbine vane stage 17 has a plurality of turbine vanes 16 arranged at intervals in the circumferential direction of the axis line As.

The compressor rotor 6 and the turbine rotor 12 are positioned on the same axis (the axis line As) and connected with each other to form the gas turbine rotor 18. A generator 20 is connected, for example, to the shaft end of the gas turbine rotor 18. The compressor casing 7 and the turbine casing 13 are connected with each other to form a gas turbine casing 19.

The compressor rotor 6 rotates so that the compressor 2 generates high-pressure air in the gas turbine 1 configured as described above. Further, this high pressure air is led to the combustor 3 and burned together with the fuel, whereby a high temperature and high pressure combustion gas is generated. Subsequently, the combustion gas is guided to the turbine 5, and sequentially collides with the turbine blades 14 and the turbine vanes 16, whereby kinetic energy is given to the turbine rotor 12 (gas turbine rotor 18). Due to this kinetic energy, the gas turbine rotor 18 rotates around the axis line As. The rotation of the gas turbine rotor 18 is taken out by the generator 20 connected to the shaft end, and used for power generation and the like.

Figure 2:
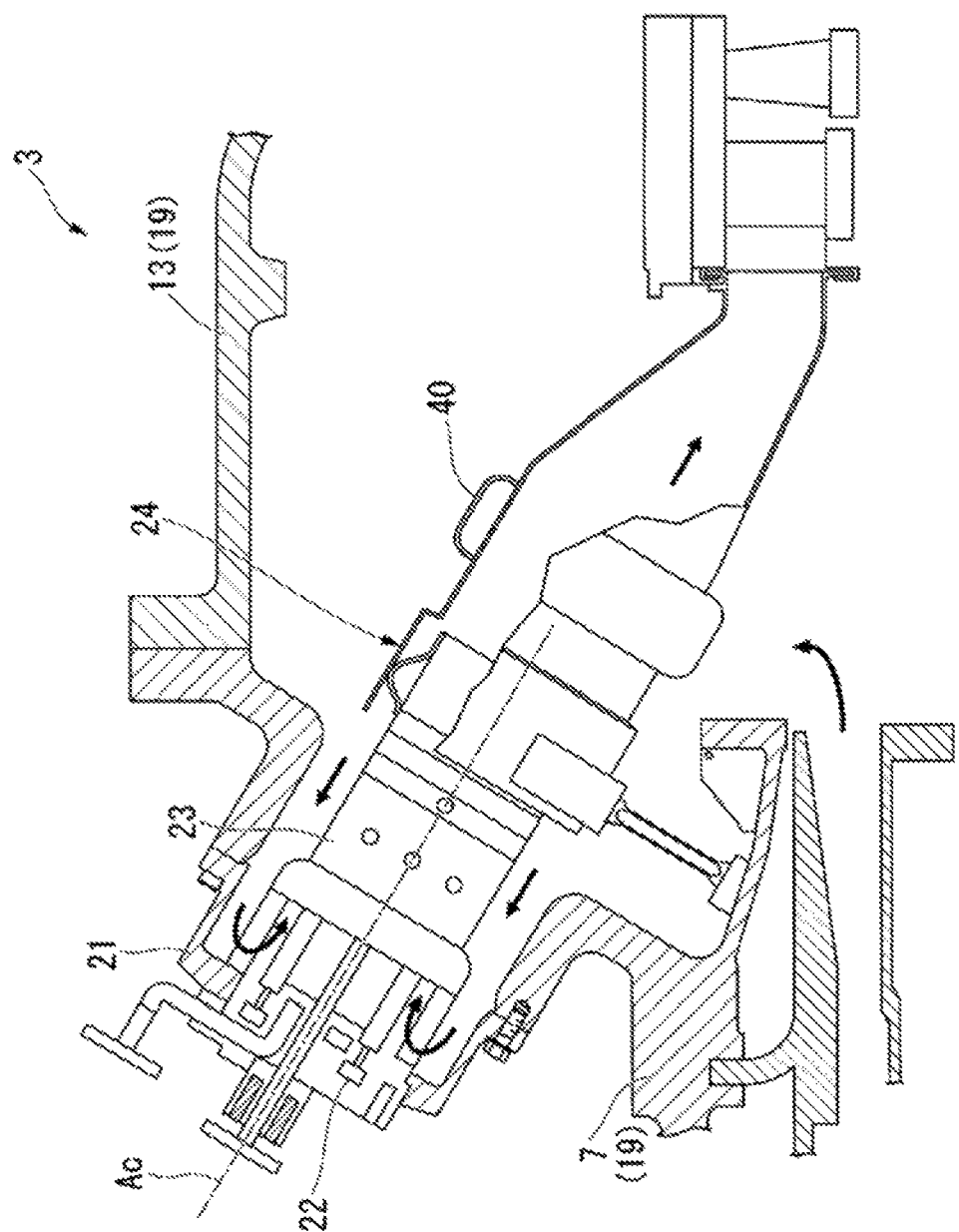
FIG. 2 is an expanded view illustrating the configuration of a combustor according to the first embodiment of the present invention.

Next, the configuration of the combustor 3 will be described with reference to FIGS. 2 and 3. The combustor 3 includes a nozzle 22 (fuel nozzle) supported by an outer cylinder 21 and configured to supply fuel, a swirler support cylinder 23 covering the nozzle 22 from the outside, and a combustion cylinder 24 connected to the swirler support cylinder 23 at the downstream side of the swirler support cylinder 23 (tubular body).

The nozzle 22 injects a premixed gas obtained by mixing the fuel and the compressed air into a combustion cylinder 24 described later. The swirler support cylinder 23 has a cylindrical shape centered on the combustor axis line Ac. The combustor axis line Ac extends in a direction intersecting the above-mentioned axis line As. A combustion cylinder 24 is connected to an end portion on the downstream side of the swirler support cylinder 23. The fuel supplied from the nozzle 22 is mixed with compressed air in a region (combustion region) in the combustion cylinder 24 and then burned to generate combustion gas. The combustion gas is supplied to the turbine 5 via the combustion cylinder 24.

The expressions such as upstream, downstream, upstream side, downstream side and the like used in the present embodiment are based on the flow direction of the combustion gas flowing inside the combustion cylinder 24. Namely, the side on which the nozzle 22 is provided with the combustion cylinder 24 as a reference is referred to as the upstream side, and the side on which the combustion cylinder 24 is provided with the nozzle 22 as a reference is referred to as the downstream side. The flow direction of the combustion gas refers to the direction along the direction of the combustor axis line Ac. Further, the flow of the combustion gas flowing inside the swirler support cylinder 23 and the combustion cylinder 24 may be referred to as "main flow".

Figure 4:
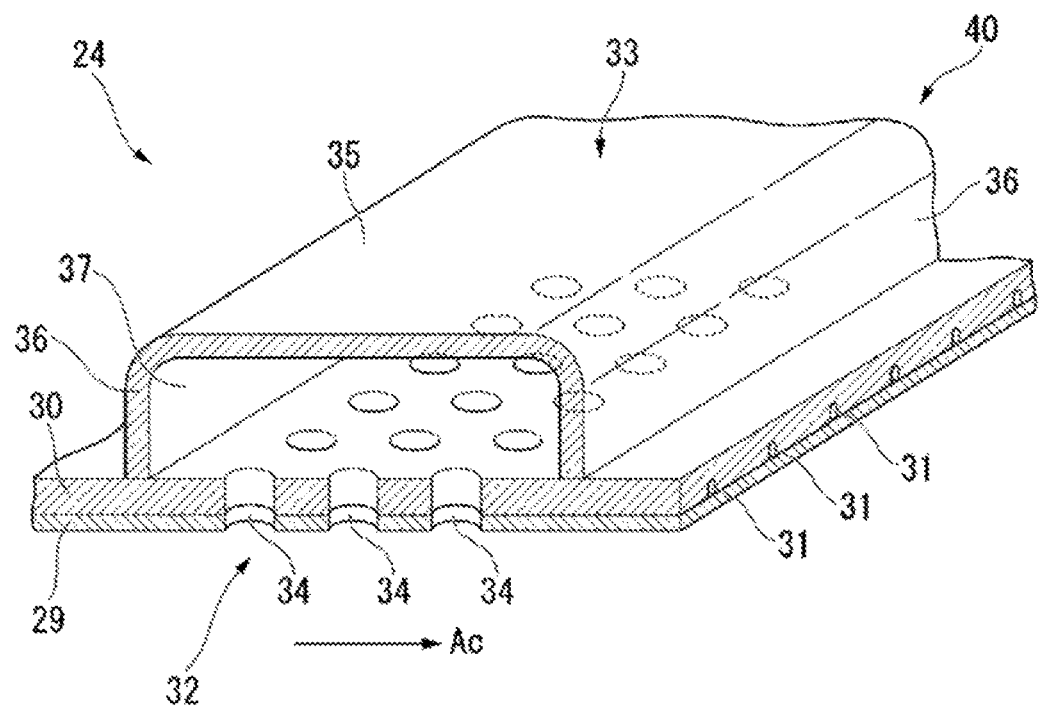
FIG. 4 is a cross-sectional view illustrating the configuration of a combustion cylinder and an acoustic damper of a combustor according to the first embodiment of the present invention.

As illustrated in FIG. 4, the combustion cylinder 24 is formed by two plates layered in the radial direction of the combustor axis line Ac. More specifically, the combustion cylinder 24 includes an inner plate 29 facing one side (radially inner side) in the plate thickness direction and an outer plate 30 facing the other side (radially outer side) in the plate thickness direction. The inner plate 29 and the outer plate 30 are overlapped with each other in the plate thickness direction.

On the inner side in the radial direction of the outer plate 30, a cooling flow path 31 called MT fin is formed as an example. These cooling flow paths 31 are formed by a plurality of recessed grooves formed so as to be recessed and dented radially outward from the radially inner surface of the outer plate 30. Each of the recessed grooves extends in the direction of the combustor axis line Ac. In addition, the plurality of these recessed grooves are formed at intervals in the circumferential direction of the combustor axis line Ac. Air (cooling air) flowing through the gas turbine casing 19 flows in the cooling flow path 31. This thereby enables the combustion cylinder 24 itself to be protected from radiant heat of the combustion gas and the like.

Furthermore, an acoustic damper 40 is attached for reducing combustion vibration generated in the combustor 3 and friction noise or the like generated between the combustion gas and the combustion cylinder 24, on the outer circumferential side of the combustion cylinder 24. The acoustic damper 40 includes a porous region 32 formed in a part of the outer circumferential surface of the combustion cylinder 24 and a housing 33 that forms the damping space 37 inside the housing 33 by covering the porous region 32.

The porous region 32 is a region which is a part in the direction of the combustor axis line Ac of the combustion cylinder 24. A plurality of holes 34 penetrating in the plate thickness direction of the combustion cylinder 24 are formed in the porous region 32. More specifically, these holes 34 are annularly arranged at equal intervals in the circumferential direction along the outer circumferential surface of the combustion cylinder 24.

The porous region 32 is covered by the housing 33 from the outer circumferential side. More specifically, as illustrated in FIG. 4, the housing 33 includes a main plate 35 extending and spaced from the outer circumferential surface of the combustion cylinder 24 in the radial direction, and a pair of side plates 36 connecting the main plate 35 and the outer circumferential surface of the combustion cylinder 24 in the radial direction. In addition, the housing 33 extends along the outer circumferential surface of the combustion cylinder 24 in the circumferential direction of the combustor axis line Ac. Namely, the housing 33 forms an annular damping space 37 between the housing 33 and the porous region 32. The damping space 37 communicates with the combustion region on the inner circumferential side of the combustion cylinder 24 through the hole portion 34.

Figure 3:
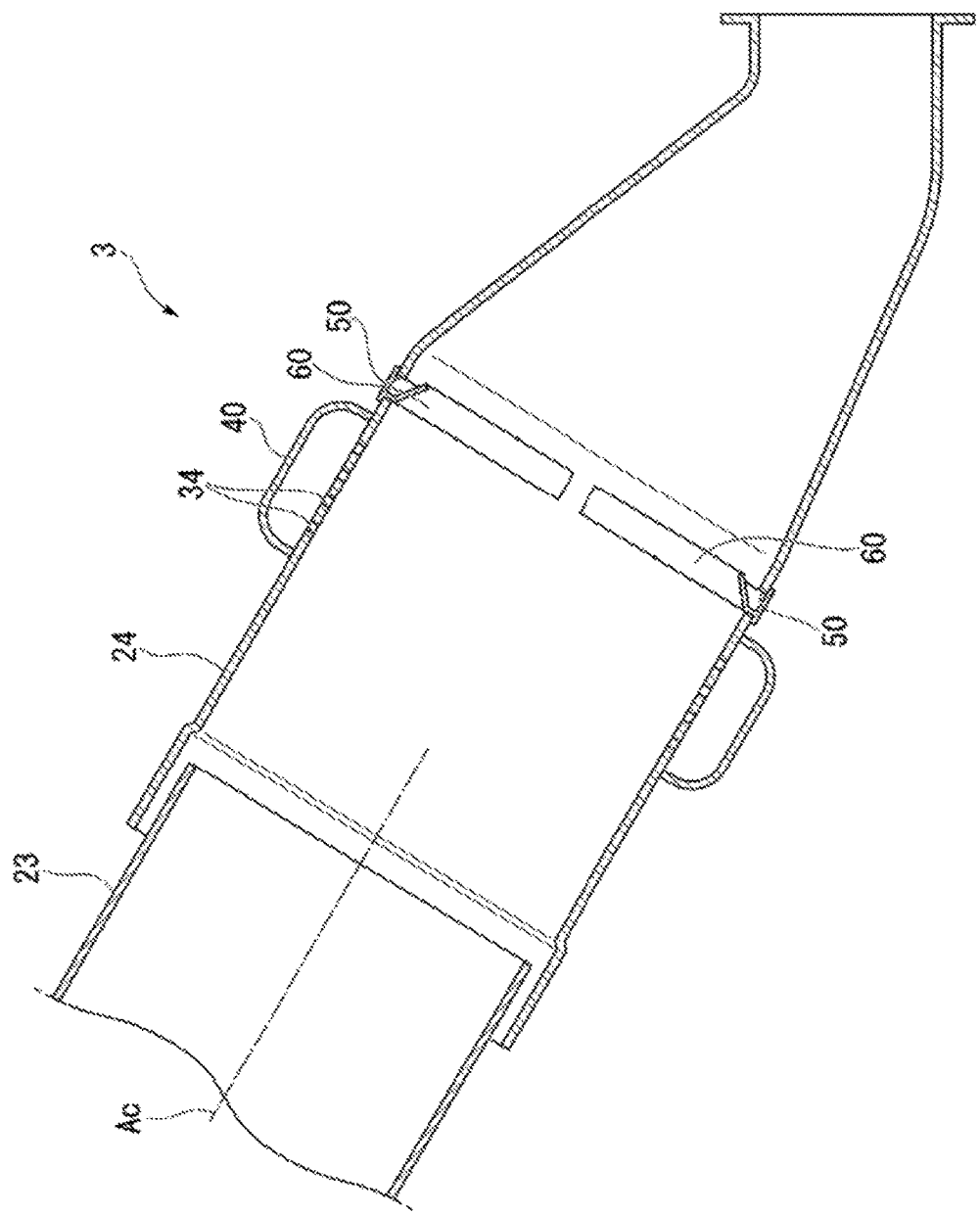
FIG. 3 is an expanded view of the important parts of a combustor according to the first embodiment of the present invention.

Further, as illustrated in FIG. 3, in the region on the inner circumferential side of the combustion cylinder 24 and on the downstream side of the acoustic damper 40, a plurality of slits 50 formed extending in the circumferential direction are arranged at intervals in the circumferential direction of the combustor axis line Ac. Each slit 50 is a substantially rectangular opening surrounded by long sides extending in the circumferential direction and short sides that intersect the long sides and extend in the direction of the combustor axis line Ac.

Figure 5:
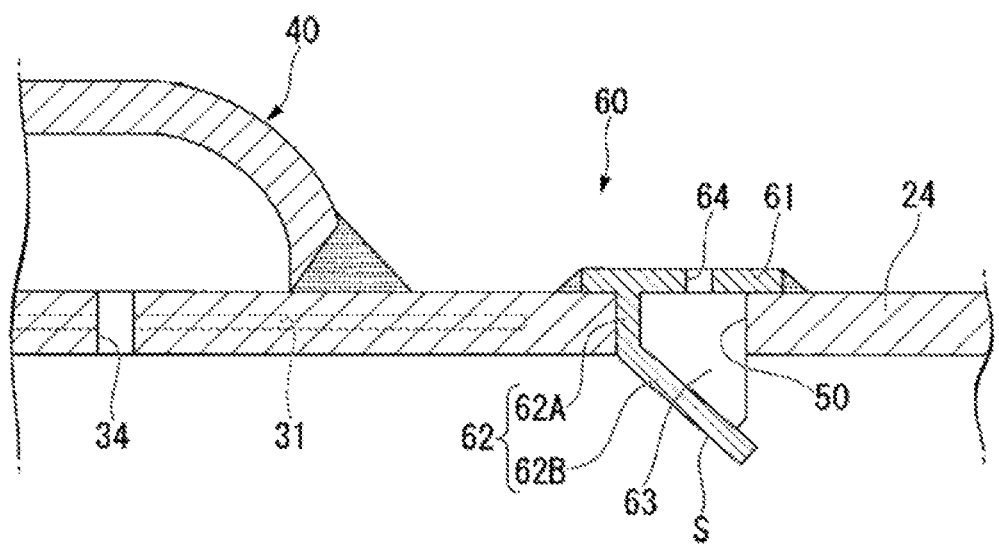
FIG. 5 is a cross-sectional view illustrating the configuration of a throttle piece according to the first embodiment of the present invention.

The plurality of these slits 50 are fitted with throttle pieces 60 from the outer circumferential side of the slits 50. A detailed configuration of the throttle piece 60 will be described with reference to FIG. 5. The throttle piece 60 includes a base portion 61 fixed to the outer circumferential surface of the combustion cylinder 24, a piece main body 62 integrally formed with the base portion 61, and a plurality of ribs 63 provided between the base portion 61 and the piece main body 62.

The base portion 61 has an arc shape extending in the circumferential direction along the outer circumferential surface of the combustion cylinder 24 as seen from the combustor axis line Ac direction. The dimension in the circumferential direction of the base portion 61 is set to be equal to or slightly smaller than the dimension in the circumferential direction of the slit 50. The radially inner surface of the base portion 61 is fixed to the outer circumferential surface of the combustion cylinder 24.

Further, a plurality of air holes 64 extending in the radial direction of the combustor axis line Ac are formed in the base portion 61. These air holes 64 are arranged at intervals in the circumferential direction in the base portion 61. External air is taken in radially inward of the base portion 61 through the air hole 64, whereby the piece main body 62 described later is cooled and protected from radiant heat of the combustion gas or the like.

The piece main body 62 has a connecting portion 62A extending radially inward from a radially inner surface of the base portion 61 and a tapered portion 62B further projecting radially inward from the radially inner end portion of the connecting portion 62A. When viewed from the circumferential direction of the combustor axis line Ac, the tapered portion 62B is inclined in a direction intersecting the combustor axis line Ac. More specifically, the tapered portion 62B extends from the radial direction outside toward inside as it extended from the upstream side to the downstream side. The surface facing the radially inner side of the tapered portion 62B is a throttle face S. The throttle face S faces the main flow flowing in the combustion cylinder 24.

The rib 63 is a plate-like member that connects the radially outer surface of the tapered portion 62B and the radially inner surface of the base portion 61 in the radial direction. The plurality of ribs 63 are provided with an interval in the circumferential direction. These ribs 63 are provided to ensure the rigidity of the entire throttle piece 60. The plurality of air holes 64 are formed in portions which do not interfere with the ribs 63.

The throttle piece 60 configured as described above is fitted into each slit 50 formed in the combustion cylinder 24 from the outer circumferential side. Each throttle piece 60 is thereby arranged with the throttle face S (the tapered portion 62B) facing the upstream side on the inner circumferential side of the combustion cylinder 24.

Next, the operation of the gas turbine 1 and the combustor 3 according to the present embodiment is described. As described above, when operating the gas turbine 1, first, an external drive source rotationally drives the gas turbine rotor 18, and external air is taken into the compressor 2. The air taken into the compressor 2 is compressed successively as it flows between the compressor blades 8 and the compressor vanes 10 in accordance with the driving of the compressor 2 to become high pressure air.

This high pressure air is introduced into the combustor 3 through the gas turbine casing 19. In the combustor 3, the premixed gas is generated by mixing this high pressure air and the fuel. By igniting this premixed gas, combustion gas of high temperature and high pressure is generated. Subsequently, the combustion gas is guided into the turbine 5, and rotates the turbine 5. By repeating such cycles continuously, the gas turbine 1 is operated.

Here, to suppress formation (to promote a complete combustion) of unburned carbide such as CO in the combustor 3, it is preferable that a circulating flow of the combustion gas be formed inside the combustion cylinder 24. Therefore, in the combustor 3 according to the present embodiment, the above-described throttle piece 60 is attached into the slit 50 of the combustion cylinder 24. Due to the provision of the throttle piece 60, the combustion gas flowing from the upstream side to the downstream side in the combustion cylinder 24 collides with the throttle face S, thereby changing the direction of the flow and heading again toward the upstream side. As a result, a circulating flow of the combustion gas is formed inside the combustion cylinder 24. This therefore enables formation of unburned carbide such as CO as described above to be suppressed, and the performance of the combustor 3 to be improved.

Further, the above configuration can be obtained simply by fitting the throttle piece 60 from the radially outer side of each slit 50 into the plurality of slits 50 formed in the combustion cylinder 24. This thereby enables the efficiency of the combustor 3 to be easily improved. Particularly, according to the above configuration, the throttle piece 60 can be attached easily even in a region away from the opening end of the combustion cylinder 24.

As another example, it is also conceivable to directly access the area where the throttle piece 60 is to be attached from the opening end portion of the combustion cylinder 24 to perform the operation. However, with this method, the work such as welding is required inside the narrow combustion cylinder 24, with a possibility not only of low workability but also a failure to obtain satisfactory work result. In addition, since this method requires a large-scale disassembly operation, it is not realistic for applying the throttle piece 60 to a combustor 3 in operation. In this respect, the configuration according to this embodiment is advantageous.

Furthermore, in the above-described combustor 3, the throttle piece 60 is provided downstream from the acoustic damper 40. Here, it is known that since air leaks from the damping space 37 of the acoustic damper 40, the temperature of the combustion gas is lowered in the region near the acoustic damper 40. Namely, unburned carbide such as CO is prone to be formed in this region.

However, according to the above configuration, since the throttle piece 60 is provided downstream from the acoustic damper 40, a vortex is formed by the throttle face S of the throttle piece 60. This vortex promotes mixing of the air and the combustion gas in the region located downstream from the acoustic damper 40, thereby enabling the formation of unburned carbide to be further suppressed.

Second Embodiment

Figure 6:
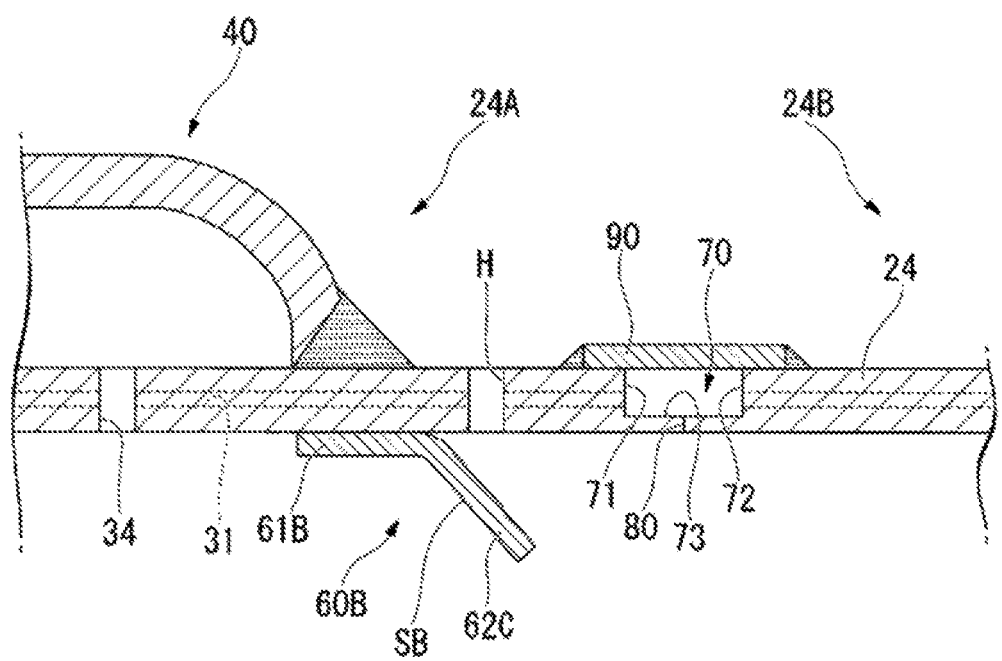
FIG. 6 is an expanded view of the important parts of a combustor according to a second embodiment of the present invention.

Next, a second embodiment of the present invention will be described with reference to FIG. 6 to FIG. 10. The same components as those in the first embodiment will be denoted by the same reference signs, and detailed descriptions thereof will be omitted. As illustrated in FIG. 6, in this embodiment, instead of the throttle piece 60 in the first embodiment, the throttle ring 60B is attached to the inner circumferential side of the combustion cylinder 24. As in the first embodiment, the throttle ring 60B is provided downstream from the acoustic damper 40.

The throttle ring 60B forms an annular shape centered on the combustor axis line Ac. The throttle ring 60B includes a fixing portion 61B extending in the direction of the combustor axis line Ac along the inner circumferential surface of the combustion cylinder 24, and a throttle ring main body 62C integrally attached to the downstream side end portion of the fixing portion 61B. The outer circumferential side surface of the fixing portion 61B is fixed to the inner circumferential surface of the combustion cylinder 24. When viewed from the circumferential direction of the combustor axis line Ac, the throttle ring main body 62C is inclined in a direction intersecting the combustor axis line Ac. More specifically, the throttle ring main body 62C extends from the radial direction outside toward inside as it extends from the upstream side to the downstream side. The surface facing the radially inner side of the throttle ring main body 62C is a throttle face SB. The throttle face SB faces the main flow flowing in the combustion cylinder 24.

A plurality of air holes H are formed in a portion of the combustion cylinder 24 where the throttle ring main body 62C is located. These air holes H are holes that penetrate the combustion cylinder 24 in the radial direction. The plurality of air holes H are arranged at intervals in the circumferential direction of the combustor axis line Ac. External air is taken into the inner circumferential side of the combustion cylinder 24 through the air hole H, whereby the throttle ring main body 62C is cooled and protected from radiant heat of the combustion gas and the like.

Further, in a portion on the outer circumferential surface of the combustion cylinder 24 on the downstream side from the throttle ring 60B, an angular groove-shaped cavity 70 recessed and dented from the outer circumferential surface inward in the radial direction is formed. Out of the surfaces forming this cavity 70, an upstream surface is an upstream surface 71, and a downstream surface is a downstream surface 72. Further, a surface connecting the upstream surface 71 and the downstream surface 72 is a bottom surface 73 which extends in the direction of the combustor axis line Ac. On the upstream surface 71 and on the downstream surface 72, the end portions of the above-described plurality of cooling flow paths 31 are each opened. Namely, the cavity 70 is formed to extend across the plurality of cooling flow paths 31. Note that the positions in the circumferential direction of the opening of the cooling flow path 31 in the upstream surface 71 and the opening of the cooling flow path 31 in the downstream surface 72 do not necessarily align with each other, and they may be offset from each other in the circumferential direction. Such a cavity 70 is formed in the circumferential direction along the outer circumferential surface of the combustion cylinder 24.

In addition, a joint portion 80 extending in the radial direction of the combustor axis line Ac is formed between the bottom surface 73 of the cavity 70 and the inner circumferential surface of the combustion cylinder 24. The joint portion 80 is interposed between the end faces created when the combustion cylinder 24 is divided in the upstream direction and downstream direction. More specifically, the joint portion 80 is formed by arc welding or the like.

The combustion cylinder 24 is divided into two portions (tubular body half bodies) with the joint portion 80 interposed therebetween. Specifically, a portion positioned upstream of the joining portion 80 is defined as an upstream side half body 24A, and a portion positioned downstream is defined as a downstream side half body 24B. The throttle ring 60B is attached to the inner circumferential surface of the upstream side half body 24A.

The cavity 70 is covered by the lid 90 from the outer circumferential side. The lid 90 is an annular member having the same or slightly larger inner diameter dimension as the outer circumferential surface of the combustion cylinder 24. Further, the dimension of the lid 90 in the combustor axis line Ac direction is configured to be sufficiently larger than the dimension of the cavity 70 in the combustor axis line Ac direction. By being covered by the lid 90, the cavity 70 and the cooling flow path 31 maintain air tightness against the outside. Namely, the air flowing through the cavity 70 and the cooling flow path 31 is prevented from leaking to the outside.

Next, a method for improving the performance of the combustor 3 according to the present embodiment will be described with reference to FIGS. 7 to 10 and FIG. 16. The method for improving the performance of the combustor 3 according to the present embodiment includes steps of forming the cavity 70 in the combustor 3 (tubular body), dividing the combustion cylinder 24 to form a pair of tubular body half bodies, attaching the above described throttle ring 60B to one of the tubular body half bodies, joining these tubular body half bodies together, and attaching the lid 90 (see FIG. 14).

Figure 7:
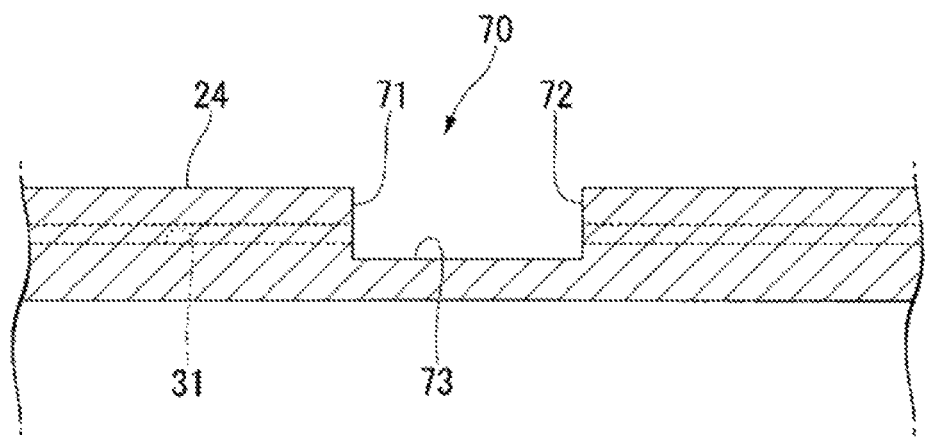
FIG. 7 is an explanatory view illustrating one step in a method for improving the performance of a combustor according to the second embodiment of the present invention, illustrating a step of forming a cavity in a tubular body.
Figure 8:
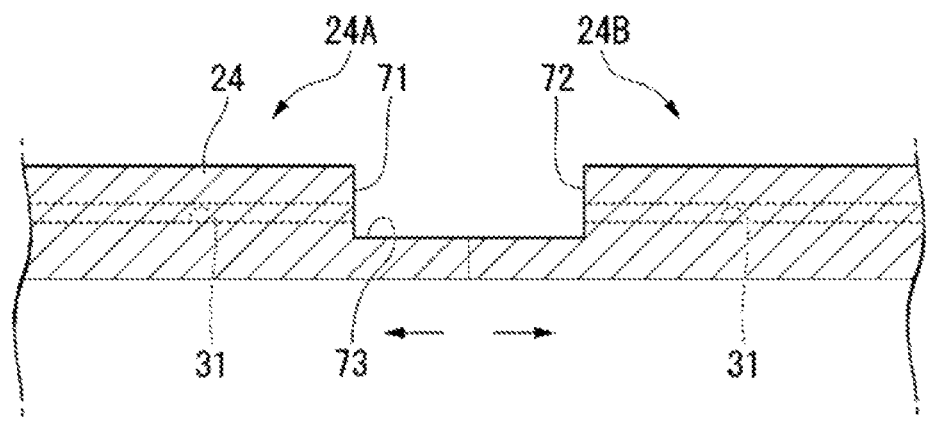
FIG. 8 is an explanatory view illustrating one step in a method for improving the performance of a combustor according to the second embodiment of the present invention, illustrating a step of dividing a tubular body.

Each of the above steps will be described in sequence. First, as illustrated in FIG. 7, the cavity 70 is formed in a desired region on the outer circumferential side of the combustion cylinder 24 (cavity forming step S1). Next, the combustion cylinder 24 is cut from the bottom surface 73 of the cavity 70 toward the inner circumferential side of the combustion cylinder 24. As a result, the combustion cylinder 24 is divided into two in the upstream and downstream directions to obtain the upstream side half body 24A and the downstream side half body 24B (tubular body dividing step S2: FIG. 8).

Figure 9:
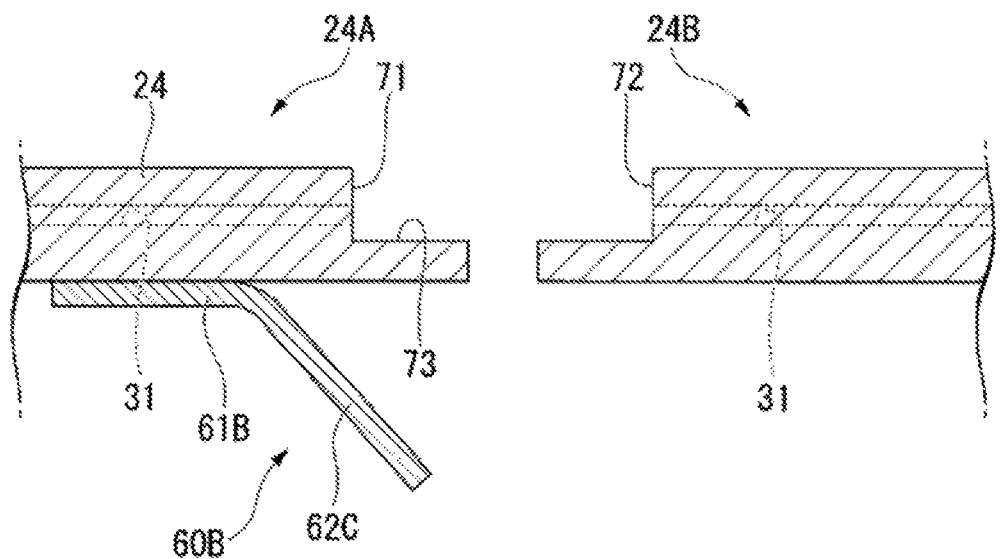
FIG. 9 is an explanatory view illustrating one step in a method for improving the performance of a combustor according to the second embodiment of the present invention, illustrating a step of attaching a throttle ring to a tubular body half body.

Next, the throttle ring 60B is attached to the inner circumferential surface of the upstream side half body 24A. Specifically, the fixing portion 61B of the throttle ring 60B is fixed to the inner circumferential surface of the upstream side half body 24A by welding or the like (throttle ring attaching step S3: FIG. 9).

Figure 10:
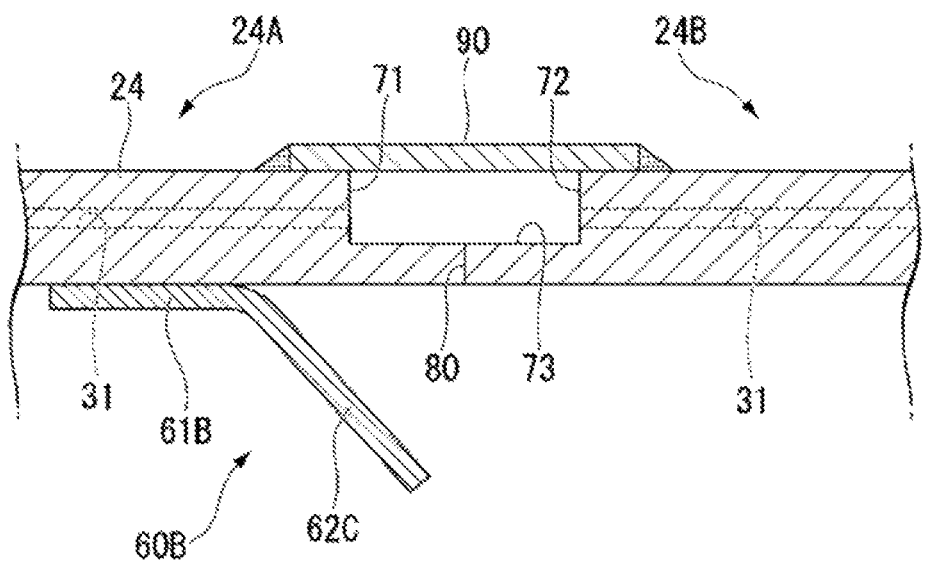
FIG. 10 is an explanatory view illustrating one step in a method for improving the performance of a combustor according to the second embodiment of the present invention, illustrating a step of joining tubular body half bodies to each other and a step of attaching a lid.

Subsequently, the upstream side half body 24A in a state in which the throttle ring 60B is attached and the downstream side half body 24B are joined together (joining step S4: FIG. 10). At this time, the positions in the circumferential direction of the opening of the cooling flow path 31 in the upstream surface 71 and the opening of the cooling flow path 31 in the downstream surface 72 of the cavity 70 do not necessarily align with each other, and they may be offset from each other in the circumferential direction.

Next, the lid 90 is attached to the combustion cylinder 24 in a state of being joined (the upstream side half body 24A and the downstream side half body 24B) as described above so as to cover the cavity 70 from the outer circumferential side (lid attaching step S5). As a result, air tightness between the cavity 70 and the cooling flow path 31, and the outside is secured. Thus, the entire process of the method for improving the performance of the combustor 3 according to the present embodiment is completed.

According to such a configuration and method, the integral combustion cylinder 24 is divided into two tubular body half bodies (the upstream side half body 24A and the downstream side half body 24B), and then the throttle ring 60B is attached to the inner circumferential side of one of the tubular body half body. This enables work to be easily performed, for example, even when the throttle ring 60B is applied to the combustor 3 that has already been assembled, or when the throttle ring 60B is applied to a region where it is difficult to access from the opening end of the combustion cylinder 24.

Further, in a case where the above-described cavity 70 is not formed, circumferential positions of the plurality of corresponding cooling flow paths 31 formed inside the wall surface of the combustion cylinder 24 need to be aligned accurately, with a possibility of lowering the workability. However, according to the above method, since the cavity 70 extending in the circumferential direction so as to extend across the plurality of cooling flow paths 31 is formed, the tubular body half bodies may be joined together without considering circumferential positions of the cooling flow paths 31. This thereby enables the combustor 3 with improved performance to be obtained more easily.

Third Embodiment

Figure 11:
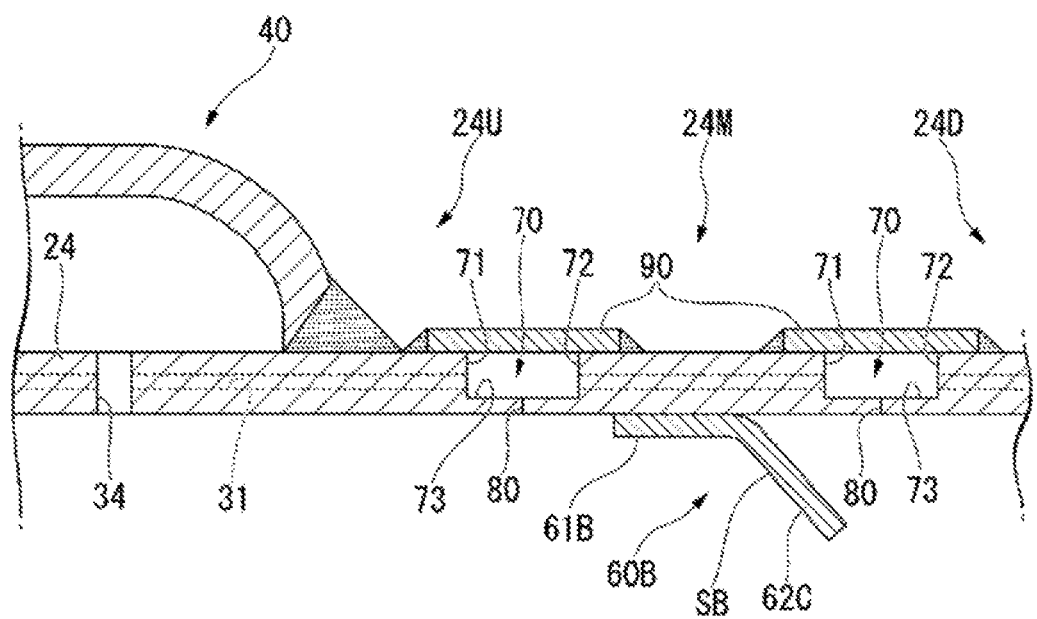
FIG. 11 is an expanded view of important parts of a combustor according to a third embodiment of the present invention.

Next, a third embodiment of the present invention will be described with reference to FIG. 11 to FIG. 15 and FIG. 17. The same reference signs are given to the same configurations as those of the above-described embodiments, and a detailed description thereof will be omitted. As illustrated in FIG. 11, the throttle ring 60B is attached to the inner circumferential side of the combustion cylinder 24 in the present embodiment. As in the above embodiments, the throttle ring 60B is provided downstream from the acoustic damper 40.

The throttle ring 60B forms an annular shape centered on the combustor axis line Ac. The throttle ring 60B has a fixing portion 61B extending in the direction of the combustor axis line Ac along the inner circumferential surface of the combustion cylinder 24, and a throttle ring main body 62C integrally attached to the downstream side end portion of the fixing portion 61B. The outer circumferential side surface of the fixing portion 61B is fixed to the inner circumferential surface of the combustion cylinder 24. When viewed from the circumferential direction of the combustor axis line Ac, the throttle ring main body 62C is inclined in a direction intersecting the combustor axis line Ac. More specifically, the throttle ring main body 62C extends from the radial direction outside toward inside as it extends from the upstream side to the downstream side. The surface facing the radially inner side of the throttle ring main body 62C is a throttle face SB. The throttle face SB faces the main flow flowing in the combustion cylinder 24.

As in the second embodiment, a plurality of air holes may be formed in a portion of the combustion cylinder 24 where the throttle ring main body 62C is located. External air is taken into the inner circumferential side of the combustion cylinder 24 through the air hole, whereby the throttle ring main body 62 C is cooled and protected from radiant heat of the combustion gas or the like.

Further, on the outer circumferential surface of the combustion cylinder 24 and in each of the upstream side and downstream side regions interposing the throttle ring 60B in the direction of the combustor axis line Ac, an angular groove-shaped cavity 70 recessed and dented from the outer circumferential surface inward in the radial direction is formed. Since these two cavities 70 have the same structure, only one cavity 70 will be representatively described below.

Out of the surfaces forming this cavity 70, an upstream surface is an upstream surface 71, and a downstream surface is a downstream surface 72. Further, a surface connecting the upstream surface 71 and the downstream surface 72 is a bottom surface 73 which extends in the direction of the combustor axis line Ac. On the upstream surface 71 and on the downstream surface 72, the end portions of the above-described plurality of cooling flow paths 31 are each opened. Namely, the cavity 70 is formed to extend across the plurality of cooling flow paths 31. Note that the positions in the circumferential direction of the opening of the cooling flow path 31 in the upstream surface 71 and the opening of the cooling flow path 31 in the downstream surface 72 do not necessarily align with each other, and they may be offset from each other in the circumferential direction. Such a cavity 70 is formed in the circumferential direction along the outer circumferential surface of the combustion cylinder 24.

In addition, a joint portion 80 extending in the radial direction of the combustor axis line Ac is formed between the bottom surface 73 of the cavity 70 and the inner circumferential surface of the combustion cylinder 24. The joint portion 80 is interposed between the end faces created when the combustion cylinder 24 is divided in the upstream direction and downstream direction. More specifically, the joint portion 80 is formed by arc welding or the like.

The combustion cylinder 24 is divided into three portions over the upstream side to the downstream side in the direction of the combustor axis line Ac interposing the two joint portions 80. Specifically, the portion located on the most upstream side is an upstream side divided body 24U, and the portion located on the most downstream side is a downstream side divided body 24D. Further, a portion positioned between the upstream side divided body 24U and the downstream side divided body 24D is an intermediate divided body 24M. The throttle ring 60B is attached to the inner circumferential surface of the intermediate divided body 24M.

Each cavity 70 is covered by a lid 90 from the outer circumferential side. The lid 90 is an annular member having the same or slightly larger inner diameter dimension as the outer circumferential surface of the combustion cylinder 24. Further, the dimension of the lid 90 in the combustor axis line Ac direction is configured to be sufficiently larger than the dimension of the cavity 70 in the combustor axis line Ac direction. By being covered by the lid 90, the cavity 70 and the cooling flow path 31 maintain air tightness against the outside. Namely, the air flowing through the cavity 70 and the cooling flow path 31 is prevented from leaking to the outside.

Figure 17:
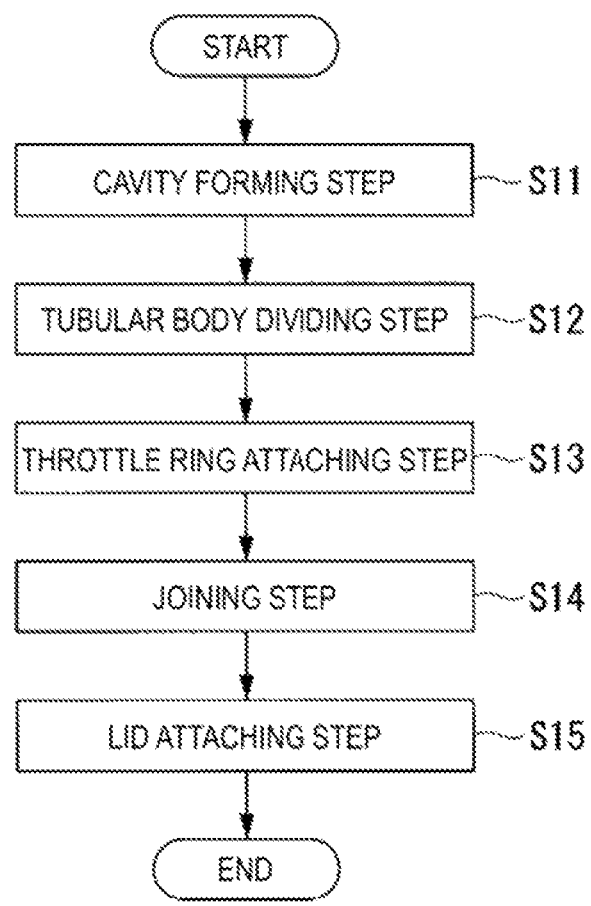
FIG. 17 is a process chart illustrating each step of a method for improving the performance of a combustor according to the third embodiment of the present invention.

Next, a method for improving the performance of the combustor 3 according to the present embodiment will be described with reference to FIGS. 12 to 15 and FIG. 17. The method for improving the performance of the combustor 3 according to the present embodiment includes steps of forming the cavity 70 in the combustor 3 (tubular body), dividing the combustion cylinder 24 and forming the upstream side divided body 24U, the intermediate divided body 24M, and the downstream side divided body 24D, attaching the above described throttle ring 60B to the intermediate divided body 24M, joining the upstream side divided body 24U, the intermediate divided body 24M, and the downstream side divided body 24D together, and attaching the lids 90 (FIG. 17).

Figure 12:
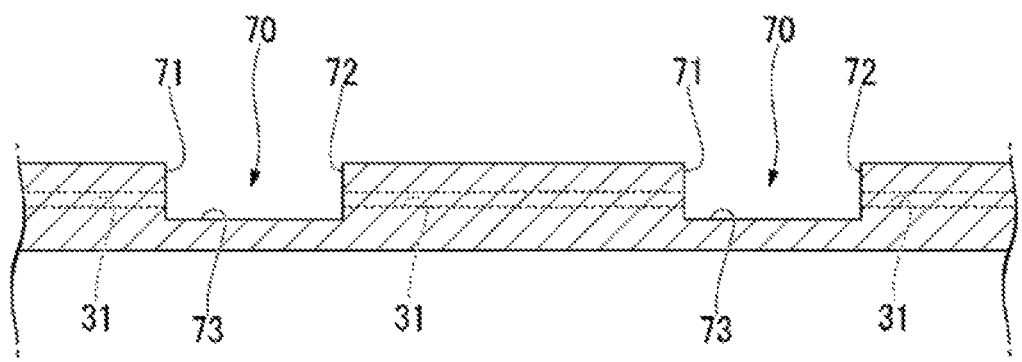
FIG. 12 is an explanatory view illustrating one step in a method for improving the performance of a combustor according to the third embodiment of the present invention, illustrating a step of forming cavities in a tubular body.
Figure 13:
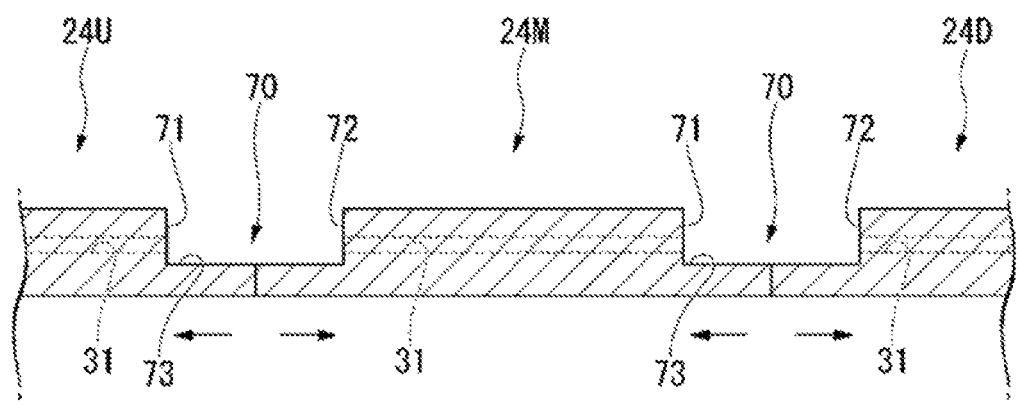
FIG. 13 is an explanatory view illustrating one step in a method of improving the performance of a combustor according to the third embodiment of the present invention, illustrating a step of dividing a tubular body.

Each of the above steps will be described in sequence. As illustrated in FIG. 12, the two cavities 70 are first formed in desired regions on the outer circumferential side of the combustion cylinder 24 (cavity forming step S11). Next, the combustion cylinder 24 is cut from the bottom surface 73 of each cavity 70 toward the inner circumferential side of the combustion cylinder 24. As a result, the combustion cylinder 24 is divided into three in the upstream and downstream direction to obtain the above-mentioned upstream side divided body 24U, intermediate divided body 24M, and downstream side divided body 24D (tubular body dividing step S12: FIG. 13).

Figure 14:
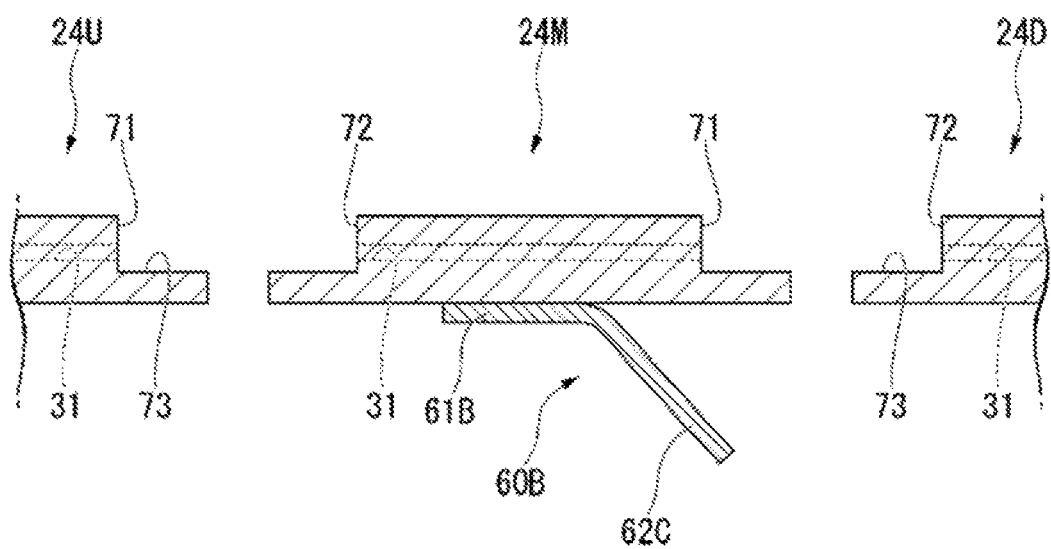
FIG. 14 is an explanatory view illustrating one step in a method of improving the performance of a combustor according to the third embodiment of the present invention, illustrating a step of attaching a throttle ring to an intermediate divided body.

Next, the throttle ring 60B is attached to the intermediate divided body 24M. Specifically, the fixing portion 61B of the throttle ring 60B is fixed to the inner circumferential surface of the intermediate divided body 24M by welding or the like (throttle ring attaching step S13: FIG. 14).

Figure 15:
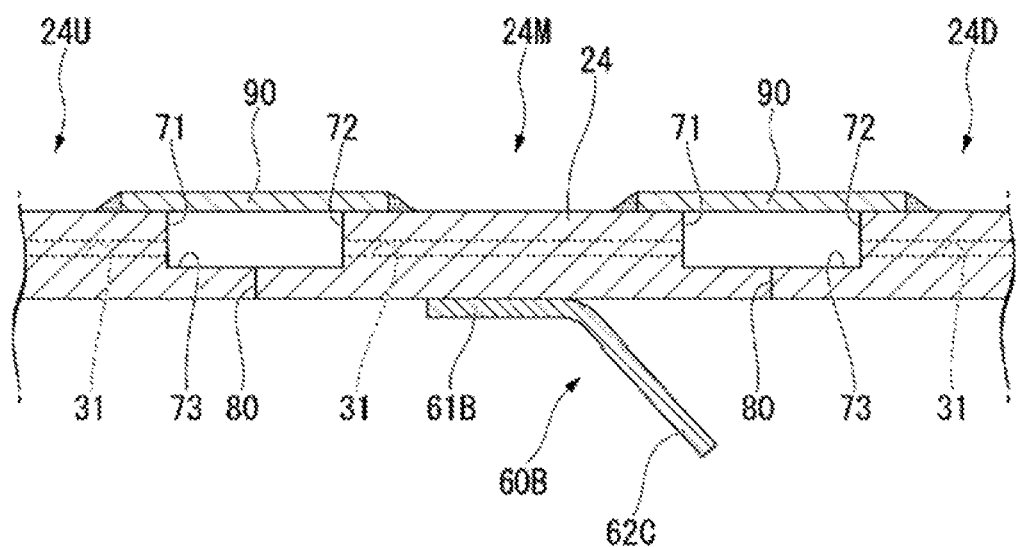
FIG. 15 is an explanatory view illustrating one step in a method for improving the performance of a combustor according to the third embodiment of the present invention, illustrating a step of joining tubular bodies and a step of attaching lids.
Figure 16:
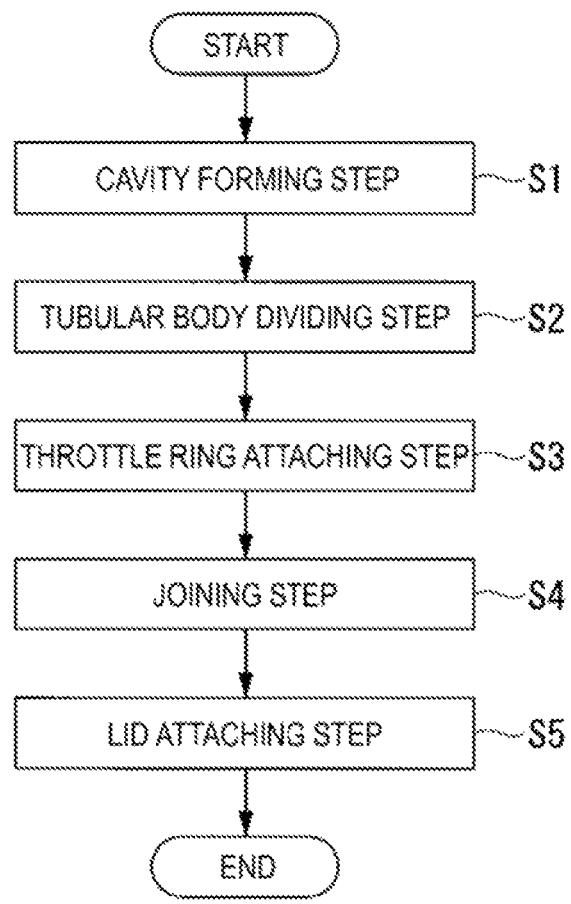
FIG. 16 is a process chart illustrating each step of a method for improving the performance of a combustor according to the second embodiment of the present invention.

Subsequently, the intermediate divided body 24M in a state in which the throttle ring 60B is attached, the upstream side divided body 24U, and the downstream side divided body 24D are joined together (joining step S14: FIG. 15). At this time, the positions in the circumferential direction of the opening of the cooling flow path 31 opened in the upstream surface 71 and the opening of the cooling flow path 31 opened in the downstream surface 72 of each cavity 70 do not necessarily align with each other, and they may be offset from each other in the circumferential direction.

Next, the lids 90 are attached to the combustion cylinder 24 in a state of being joined as described above so as to cover the cavities 70 from the outer circumferential side (lid attaching step S15). As a result, air tightness between the cavity 70 and the cooling flow path 31, and the outside is secured. Thus, the entire process of the method for improving the performance of the combustor 3 according to the present embodiment is completed.

According to such a configuration and method, the integral combustion cylinder 24 is divided into the upstream side divided body 24U, the intermediate divided body 24M, and the downstream side divided body 24D, and then the throttle ring 60B is attached to the inner circumferential side of the intermediate divided body 24M. This enables work to be easily performed, for example, even when the throttle ring 60B is applied to the combustor 3 that has already been assembled, or when the throttle ring 60B is applied to a region where it is difficult to access from the opening end of the tubular body.

Further, in a case where the above-described cavity 70 is not formed, circumferential positions of the plurality of corresponding cooling flow paths 31 formed inside the wall surface of the combustion cylinder 24 need to be aligned accurately, with a possibility of lowering the workability. However, according to the above method, since the cavities 70 extending in the circumferential direction so as to extend across the plurality of cooling flow paths 31 are formed, the upstream side divided body 24U, the intermediate divided body 24M, and the downstream side divided body 24D may be joined together without considering circumferential positions of the cooling flow paths 31. This thereby enables the combustor 3 with improved performance to be obtained more easily.

In addition, since the intermediate divided body 24M can be independently moved from the upstream side divided body 24U and the downstream side divided body 24D, a higher workability may also be secured than that in a case in which each of the above steps is performed in a limited space around the combustor 3, for example.

Each embodiment of the present invention has been described above. Various modifications can be made to the above described structure and method without departing from the gist of the present invention.

For example, for each of the processes described in the method for improving the performance of the combustor 3, the application target is not limited to the combustor 3 only. The same process can be applied to any device as long as there is a request to attach a structure on the inner circumferential side of the tubular body in which the closed space is formed on the inside.

INDUSTRIAL APPLICABILITY

The present invention enables provision of a combustor with improved performance and a method for improving combustor performance in which performance can be easily improved.

REFERENCE SIGNS LIST

1 Gas turbine
2 Compressor
3 Combustor
5 Turbine
6 Compressor rotor
7 Compressor casing
8 Compressor blade
9 Compressor blade stage
10 Compressor vane
11 Compressor vane stage
12 Turbine rotor
13 Turbine casing
14 Turbine blade
15 Turbine blade stage
16 Turbine vane
17 Turbine vane stage
18 Gas turbine rotor
19 Gas turbine casing
21 Outer cylinder
22 Nozzle
23 Swirler support cylinder
24 Combustion cylinder
24A Upstream side half body
24B Downstream side half body
24D Downstream side divided body
24M Intermediate divided body
24U Upstream side divided body
29 Inner plate 30 Outer plate
31 Cooling flow path
32 Porous region
33 Housing
34 Hole
35 Main plate
36 Side plate
37 Damping space
40 Acoustic damper
50 Slit
60 Throttle piece
60B Throttle ring
61 Base portion
61 B Fixing portion
62 Piece main body
62A Connection portion
62B Tapered region
62C Throttle ring main body
63 Rib
64 Air hole
70 Cavity
71 Upstream surface
72 Downstream surface
73 Bottom surface
80 Joint portion
90 Lid
Ac Combustor axis line
As Axis line
G Generator
H Air hole
S Throttle face
Sb Throttle face

The invention claimed is:

1. A combustor, comprising:
a fuel nozzle configured to inject fuel;
a tubular body having a tubular shape and including a combustion region and a plurality of cooling flow paths, the combustion region being formed inside the tubular body and configured to allow combustion gas generated by combustion of the fuel to flow and the plurality of cooling flow paths being formed inside a wall surface while extending in a flow direction of the combustion gas and configured to allow cooling air to flow through the plurality of cooling flow paths; and
a throttle ring having an annular shape, protruding radially inward from an inner circumferential side of the tubular body, including a throttle surface extending in the flow direction as the throttle surface extends radially inward from the inner circumferential side of the tubular body, and extending in a circumferential direction on the inner circumferential side of the tubular body, wherein
the combustor includes a pair of cavities formed in an outer circumferential surface of the tubular body, recessed radially inward from the outer circumferential surface, and extending in the circumferential direction across the plurality of cooling flow paths, wherein one of the pair of cavities is provided on each side of a position at which the throttle ring is positioned with respect to the flow direction, and
the combustor further includes lids on the outer circumferential surface and covering the respective cavities.

2. The combustor according to claim 1, further comprising:
an acoustic damper disposed on the outer circumferential side of the tubular body and including a damping space formed inside the acoustic damper in communication with an interior of the tubular body, wherein
the throttle ring is provided downstream from the acoustic damper.

3. A method for improving performance of a combustor, the combustor including a tubular body including a plurality of cooling flow paths formed inside a wall surface, extending in a flow direction of a combustion gas, and configured to allow cooling air to flow through the plurality of cooling flow paths, and a throttle ring having an annular shape, protruding radially inward from an inner circumferential side of the tubular body, including a throttle surface extending radially inward from the inner circumferential side of the tubular body, and extending in a circumferential direction on the inner circumferential side of the tubular body, the method comprising the steps of:
forming a pair of cavities in an outer circumferential surface of the tubular body, the pair of cavities being spaced apart in the flow direction, being recessed radially inward from the outer circumferential surface, and extending in the circumferential direction across the plurality of cooling flow paths;
forming, by dividing the tubular body along the pair of cavities into three in the flow direction, an upstream side divided body, an intermediate divided body, and a downstream side divided body;
attaching the throttle ring to an inner circumferential side of the intermediate divided body;
joining each of the upstream side divided body and the downstream side divided body to the intermediate divided body to which the throttle ring is attached; and
attaching lids configured to cover the pair of cavities.

* * * * *